(12) United States Patent
Branham et al.

(10) Patent No.: US 6,459,372 B1
(45) Date of Patent: Oct. 1, 2002

(54) HAND-HELD COMPUTER FOR IDENTIFYING HUNTING AND FISHING AREAS AND DISPLAYING CONTROLLING REGULATIONS PERTAINING THERETO

(76) Inventors: Devin Branham, 100 Gail Dr., Wasilla, AK (US) 99654; James Belz, 100 Gail Dr., Wasilla, AK (US) 99654

(*) Notice: Subject to any disclaimer, the term of this patent is extended or adjusted under 35 U.S.C. 154(b) by 0 days.

(21) Appl. No.: 09/867,887

(22) Filed: May 29, 2001

(51) Int. Cl.[7] .................................................. G08B 1/08
(52) U.S. Cl. ................. 340/539; 340/573.1; 340/573.2; 340/989; 340/990; 340/691.6
(58) Field of Search ................................ 340/539, 573.1, 340/573.2, 989, 990, 825.3, 691.6, 286.02

(56) References Cited

U.S. PATENT DOCUMENTS

| | | | | |
|---|---|---|---|---|
| 4,597,069 A | * | 6/1986 | Milano et al. ................. 367/95 |
| 5,594,707 A | * | 1/1997 | Goto et al. ................. 367/111 |
| 6,002,644 A | * | 12/1999 | Wilk ............................ 367/131 |
| 6,102,406 A | * | 8/2000 | Miles et al. ................. 273/430 |
| 6,170,189 B1 | * | 1/2001 | Klein ............................ 43/17 |
| 6,222,449 B1 | * | 4/2001 | Twining ..................... 345/539 |

* cited by examiner

*Primary Examiner*—Jeffery Hofsass
*Assistant Examiner*—Daniel Previl
(74) *Attorney, Agent, or Firm*—Michael J. Javella

(57) ABSTRACT

A device that monitors a person's location and compares it to a database of fish and game regulations for a given area. The user can verify position, but can also display fish and game regulations that apply in that area. Moreover, the unit can also monitor the user's position with respect to boundaries. If the user crosses into another area, the unit can alert the user of this and the user can then discover the rules for the area and if necessary, leave the area. In this way, hunters and fishers can now travel through the back country confident that they always know the regulations and boundaries of the areas that they occupy.

10 Claims, 12 Drawing Sheets

HAND-HELD COMPUTER FOR IDENTIFYING HUNTING AND FISHING AREAS AND DISPLAYING CONTROLLING REGULATIONS PERTAINING THERETO

CROSS REFERENCE TO RELATED APPLICATIONS

Not Applicable

STATEMENT REGARDING FEDERALLY SPONSORED RESEARCH AND DEVELOPMENT

Not applicable

BACKGROUND OF THE INVENTION

1. Field of the Invention

This invention relates to portable Global Positioning Satellite (GPS) systems and particularly to GPS systems that locate hunters and fishers with respect to hunting and fishing areas to ensure compliance with published regulations.

2. Description of the Prior Art

Hunting and fishing these days requires an outdoors person to be familiar with many pages of complex regulations. Boundaries are established for hunting and fishing that permit or forbid people in engaging these activities. Often, what is legal in one area is illegal in the adjacent areas. Many times hunters of fishers cross these boundaries unexpectedly, placing them in violation of the rules. Within an approved area the number, size and type of fish or animals available for hunting varies from location and with the seasons-and sometimes by days of the week. Many times violations carry penalties from small fines to arrest and imprisonment. Therefore, it is every outdoor person's responsibility to be knowledgeable of these rules and to know where they are at any time within a particular game or fish unit.

With the volume of information, it is very difficult for the average outdoor person to be totally familiar with the rules and even more, with the specific boundaries of the various fish and game units.

Within the last few years a new type of locator has been developed. The Global Positioning Satellite system (GPS system) uses a number of satellites to locate one's position. All that is needed is a receiver and the person can know within a few feet, exactly where he or she is. Early systems gave readouts in latitude and longitude positions. Although helpful, one needs a map to be able to know where one is in relation to boundaries. Further developments if GPS systems produced handheld units that translate the satellite data into readable maps.

Despite these improvements, there is no device that ties the mapping information to fish and game regulations and units.

BRIEF DESCRIPTION OF THE INVENTION

This invention uses the Global Positioning system in conjunction with a map database that acts as an interfaces with a memory card/disc/cartridge database that is capable of Internet downloads. The system can have multiple languages. The databases include current hunting and fishing regulations, park boundaries, and other special areas of interest.

This system has an alert function that alerts the user by audible alarm, screen flash, color change or vibration to any change in location, regulation changes, hazards or time changes. The alarm is programmable and allows the user to select the alarm settings from a menu.

As noted, the alarms can be programmed to alert the user to regulation changes, entering or approaching a different hunting/fishing boundary, unit or sub unit, shooting/fishing hours (sunrise/sunset), camping restrictions, campfire restrictions, bait restrictions, weapon/lure restrictions, shooting restrictions, park boundaries, preserve boundaries, refuges, public access areas or lack of, bag limit changes, hazardous areas (e.g., avalanche warnings, thin ice, high fire danger, weather warnings), vehicle restrictions, private property, Federal land, and State land locations.

Hunting regulations are stored on a card/disc/cartridge for each state/country/province. Regulations can be stored in multiple languages. Regulations for database cards already owned are updated via the Internet or vendor download. Regulations are listed in their entirety and are accessible by scroll down menu, species, location, weapon, date and time in relation to your current position.

Fishing Regulations are also stored on a card/disc/cartridge for each state/country/province. These regulations can be also in multiple languages. As above, these database cards already owned are updated via the Internet or be vendor download. Regulations are listed in their entirety and is accessible by scroll down menu, species, location, method of fishing, date and time in relation to your current position. Moreover, the system tells the user if a lake, stream or beach has public access and directions to where it is.

The system may also have a recreational guide area that allows the down loading of snow conditions, fishing reports, flood warnings, surf reports etc, which may be used in conjunction with the radio weather band, for example, to bring real time conditions to the user.

DETAILED DESCRIPTION OF THE INVENTION

Figure 1:
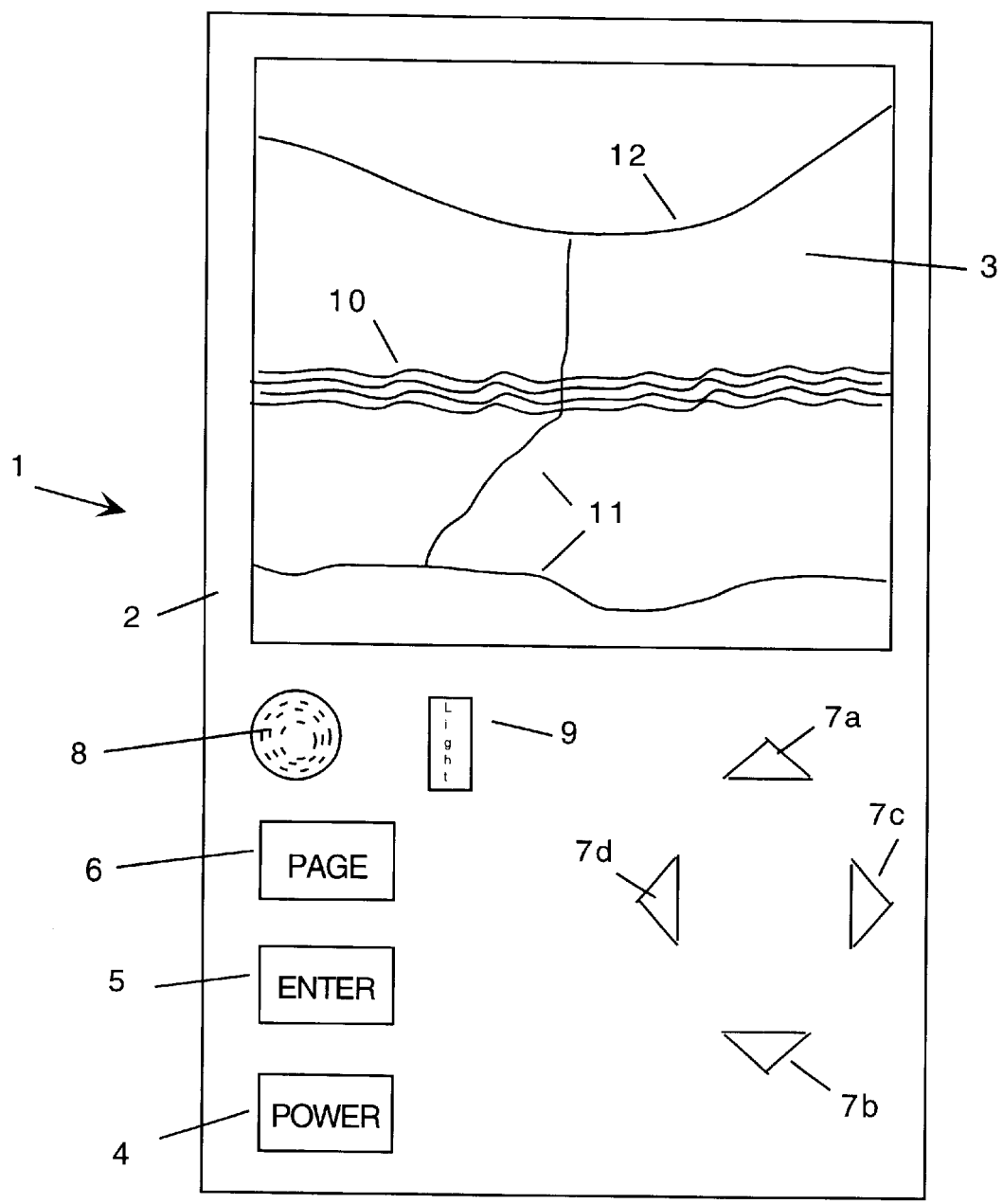
FIG. 1 is a plan view of the basic embodiment of the invention.
Figure 3:
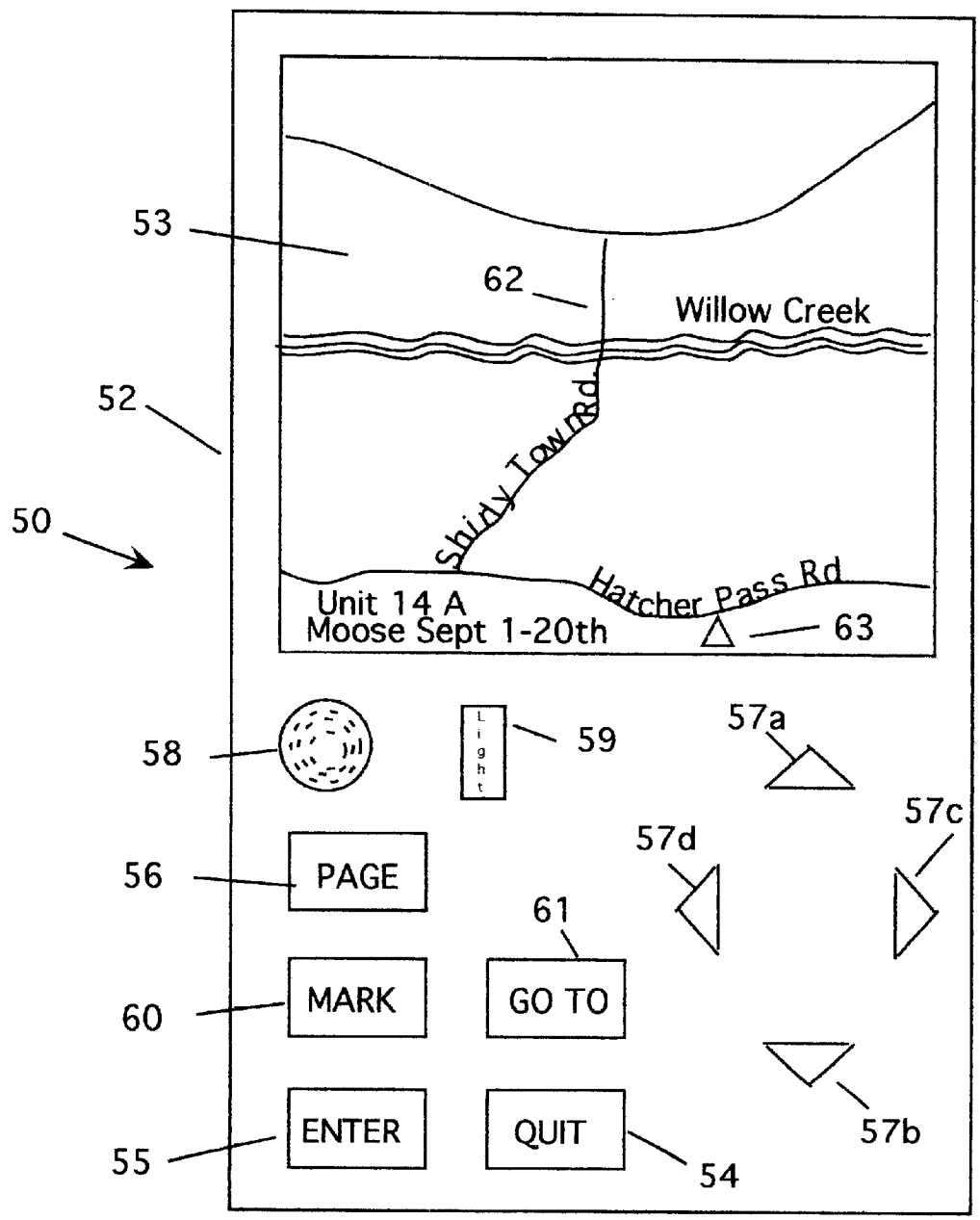
FIG. 3 is a plan view of the advanced embodiment of the invention.

Referring now to FIG. 1, the front control panel and display for the basic embodiment 1 of the device is shown. The device 1 has a housing 2 that is waterproof and, in the preferred embodiment, is nitrogen filled. At the top of the housing 2 is a screen 3. The screen 3 is a liquid crystal display that is common to the art; however, other types of displays can be used as well. The screen 3 is designed to show images, such as a simple map as shown in FIG. 1, data as discussed below, or both, as shown in FIG. 3. The operating controls are located under the screen as shown. These include: a power button 4 (on/off); an "enter" button 5, which is used to select items from the various menus as discussed below; a page button 6, which is used to select a desired screen, as discussed below; four scroll buttons: 7a, scroll up, 7b, scroll down, 7c scroll right, and 7d scroll left; a speaker 8, which is waterproof; and a "light" button 9, which is used to operate a back light for the screen in low light conditions.

As shown in FIG. 1, the screen is displaying map page. The map shows typical geographic features, such as a creek 10, roads 11 and hills 12.

Figure 2:
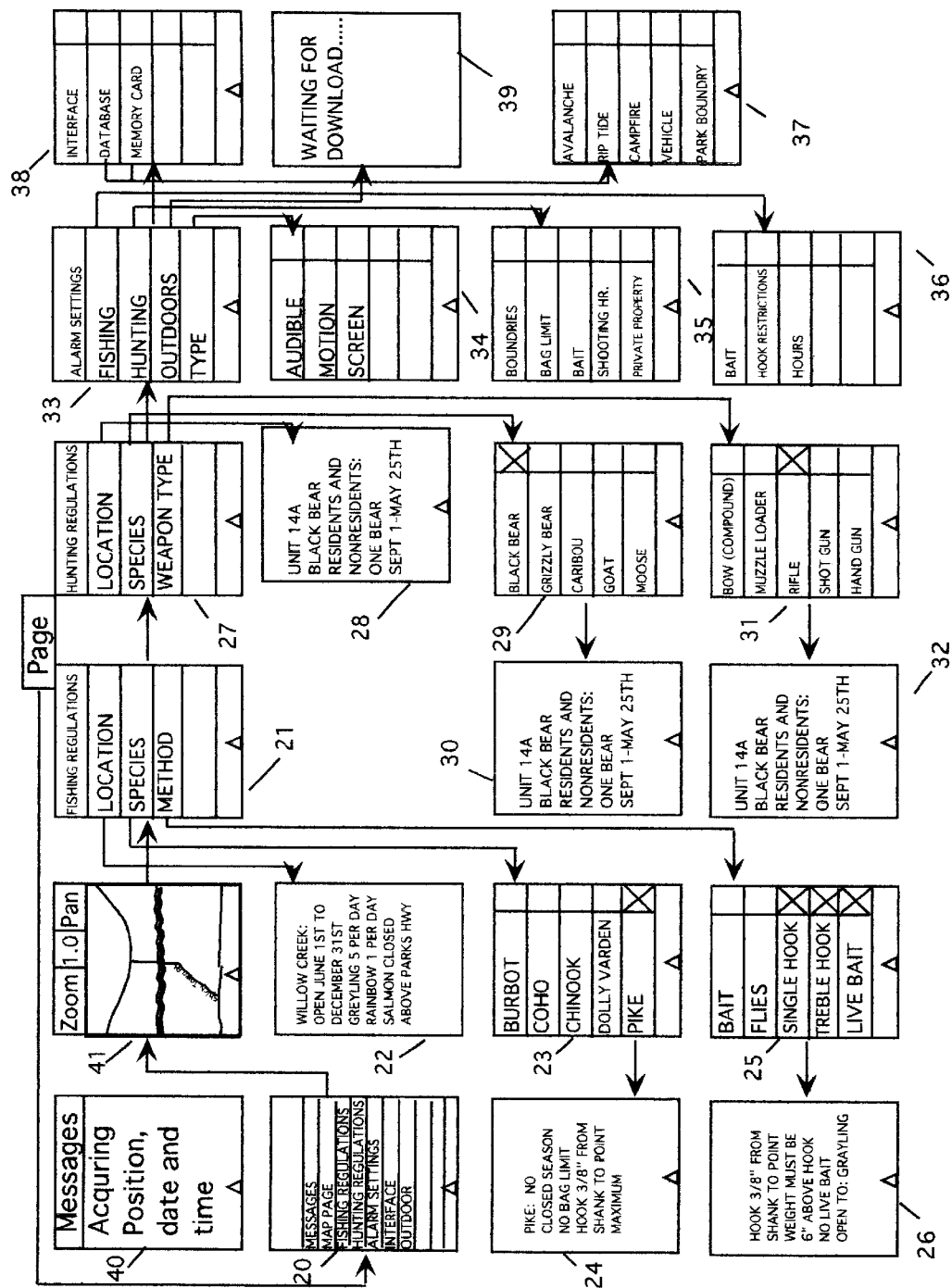
FIG. 2 is a detail view of menus and screens available on the basic embodiment of the invention.

FIG. 2 is a table showing the screens and displays for the basic embodiment of FIG. 1. The user presses the "page" button 6 to scroll around the various pages. As shown, FIG. 2 is a chart showing the flow between the various pages. At the top of the chart is the page button 6. The first page displayed is the menu page 20. As shown, the menu page has a number of selections including: messages, map page, fishing regulations, hunting regulations, alarm setting, interface, and outdoor. The selections are made by using the scroll buttons to move down or up on the page until the desired menu item is highlighted. Then, the user presses the enter button 5 to make the selection and move to the desired page.

In the top left center of FIG. 2 is the fishing regulations page 21. As shown, it has titles including location, species, and method. The location page is shown as 22, the species page is shown as 23. Note that the species page has a subpage 24 that shows a page explaining the rules for one of the species shown (in this case, pike). The method page is shown as 25. Again, this page also has a number of sub pages. Here, page 26 displays the rules for using a single hook.

At the top right center of FIG. 2 is the hunting regulations page 27. As shown, it has titles including location, species, and weapon type. The location page is shown as 28, the species page is shown as 29. Note that like the fishing pages, the hunting species page has a subpage 30 that shows a page explaining the rules for one of the species shown (in this case, black bear). The weapon page is shown as 31. Again, this page also has a number of sub pages. For example, FIG. 2 show a display for page 32 that shows the rules for using a rifle. Note that this page actually lists all animals that can be taken at the time and place specified using, in this case, a rifle. The animals are listed alphabetically and the entire list can be viewed using the scroll key. As shown, the figure lists black bear as being an eligible species for rifles for the sates specified.

The alarm settings page 33 is next. On this page, the alarm can be set for different categories, such as fishing, hunting, outdoors and type. The type page is shown as page 34. It includes selections as audible, motion or screen. The hunting alarms are shown on page 35. The fishing alarms are shown on page 36. The outdoor alarms are shown on page 37 and include things such as avalanche danger, vehicle restrictions and park boundaries.

The interface page is shown as page 38. It includes selections such as the main database and connections to a memory card. A sub screen that displays status of the interface is shown as page 39.

The messages screen is shown as page 40. This screen provides the user with status and update information. Finally, the map page is shown as page 41. Here, the page shows viewing controls such as pan and zoom for the user's convenience.

Referring now to FIG. 3, the front control panel and display for the preferred embodiment 50 of the device is shown. The device 51 has a housing 52 that is waterproof and, in the preferred embodiment, is nitrogen filled. At the top of the housing 52 is a screen 53. The screen 53 is a liquid crystal display that is common to the art. The screen 53 is designed to show images, such as the map as shown in FIG. 3, and data as discussed below. In the preferred embodiment, the map shown in FIG. 3 has information as to place names and other information useful to the user. The operating controls in this embodiment are located under the screen and include additional buttons. The preferred controls include: a "quit" button 54, which returns the user to the menu page and if pressed and held turns the unit on or off; an "enter" button 55, which is used to select items from the various menus as discussed below; a page button 56, which is used to select a desired screen, as discussed below; four scroll buttons: 57a, scroll up, 57b, scroll down, 57c scroll right, and 57d scroll left; a speaker 58, which is waterproof; a "light" button 59, which is used to operate a back light for the screen in low light conditions; a "mark" button 60, which is used to enter a way point or mark a position relevant to the user; and a "goto" button 61, which is used to plot a return route to a previously entered way point. The screen 53 also displays two additional pieces of information; the location of the user 62 and a scroll prompt 63.

As in FIG. 1, the screen 53 is displaying map page in FIG. 3. Note here that the map not only shows typical geographic features, such as a creek, roads and hills. It also labels these features.

Figure 4:
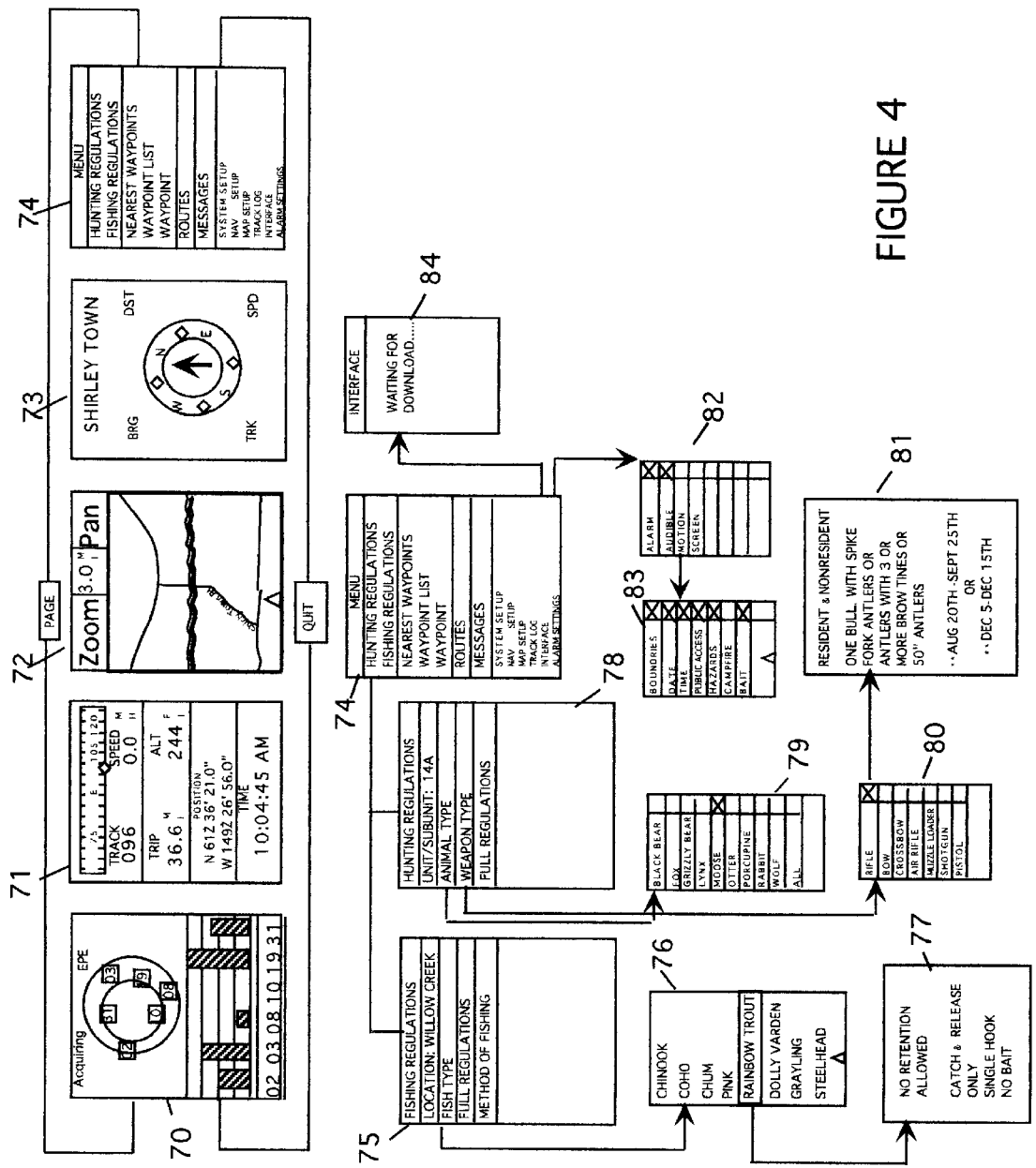
FIG. 4 is a detail view of menus and screens available on the advanced embodiment of the invention.

FIG. 4 is a table showing the screens and displays for the preferred embodiment of FIG. 3. As before, the user presses the "page" button 56 to scroll around the various pages. The user also has other options for scrolling as well. The "quit" button 54 is used to return the user to the main menu page. As shown, FIG. 4 is a chart showing the flow between the various pages. At the top of the chart is the page button 56. The main displays available are shown at the top of the figure. The first is satellite acquisition page 70. The next is an information page 71, showing speed, altitude, position and time. The next is the map page 72 showing the zoom and pan controls. The next is a compass page 73 showing the direction to a particular destination. These display pages 70–73 are display pages typically found on standard GPS receivers.

The last display on the top section is the menu page 74. The menu page 74 is shown below these pages in the center of the figure. As shown, the menu page 74 has a number of selections including: messages, way point lists, fishing regulations, hunting regulations, a system setup page, and a routes page The selections are made by using the scroll buttons to move down or up on the page until the desired menu item is highlighted. Then, the user presses the enter button 55 to make the selection and move to the desired page.

At the left of FIG. 4 is the fishing regulations page 75. As shown, it has titles including location, species, and method. The fish type page is shown as 76. A subpage 77 shows the rules for the species shown (in this case, rainbow trout). Next to the fishing regulations page is the hunting regulations page 78. As shown, it has titles including unit/subunit, Animal type, and weapon type. Below that is a sample of the animal type page 79. Below that is a page is weapon page 80. This page has a number of sub pages. Here, page 81 displays the rules for using a rifle.

The alarm settings page 82 is shown below the main menu page. On this page, the alarm can be set for different categories, such as audible, motion or screen. The outdoor alarms are shown on page 83 and include things, such as hazards, public access restrictions and boundaries.

The interface page is shown as page 84. It includes selections such as the main database and connections to a memory card. The page shown displays status of the interface.

The messages screen is not shown. However, it operates in the same manner as that of the first embodiment.

Note that these screens and displays are representative of the preferred embodiment. However, their exact design, listing order, categories and other aspects are not limited to those shown. Any particular page layout or design that encompasses these particular functions is intended to be included within the scope of this design.

Figure 5:
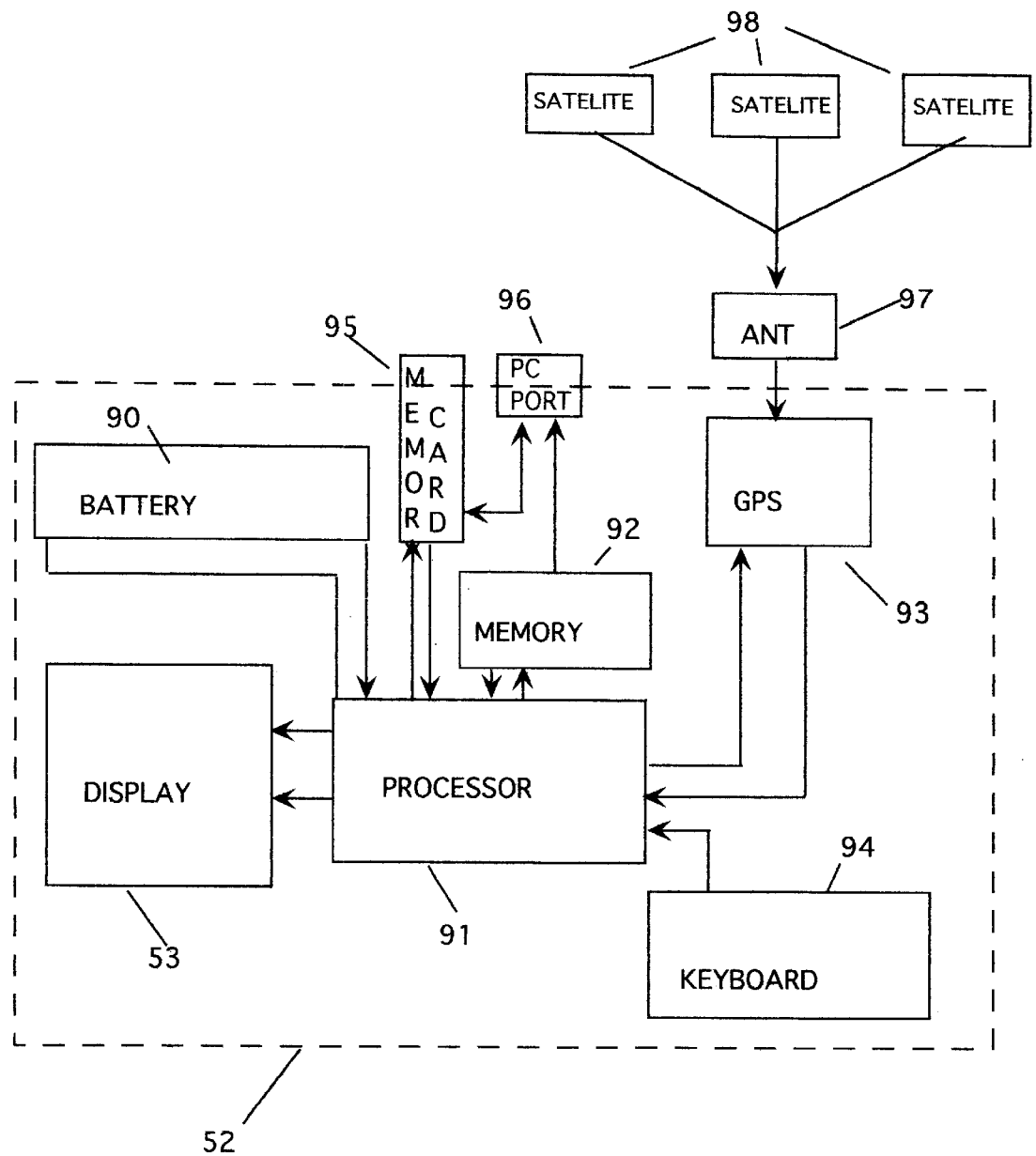
FIG. 5 is a schematic block diagram showing the major system components.

Referring now to FIG. 5, a block diagram of the preferred embodiment is shown. In this figure, the housing 52 is represented by the dashed line. Within the housing 52 are a battery 90 a central processor 91 a memory storage unit 92 a GPS system 93 the input keys 94 (labeled as "keyboard") and the display screem 53. These components are assembled and connected using techniques well know in the art. The housing 52 also has a memory card reader 95 and a PC port 96. Both of these elements are shown partially extending beyond the dashed line to indicate that these elements attach to components outside of the housing. The GPS system is attached to an antenna 97, also using techniques well known in the art. As is customary, the antenna 97 receives signals from one or more global positioning satellites 98. These signals provide location data that are used by the system to inform the user of both position and what regulations and restriction apply in that area.

Figure 6:
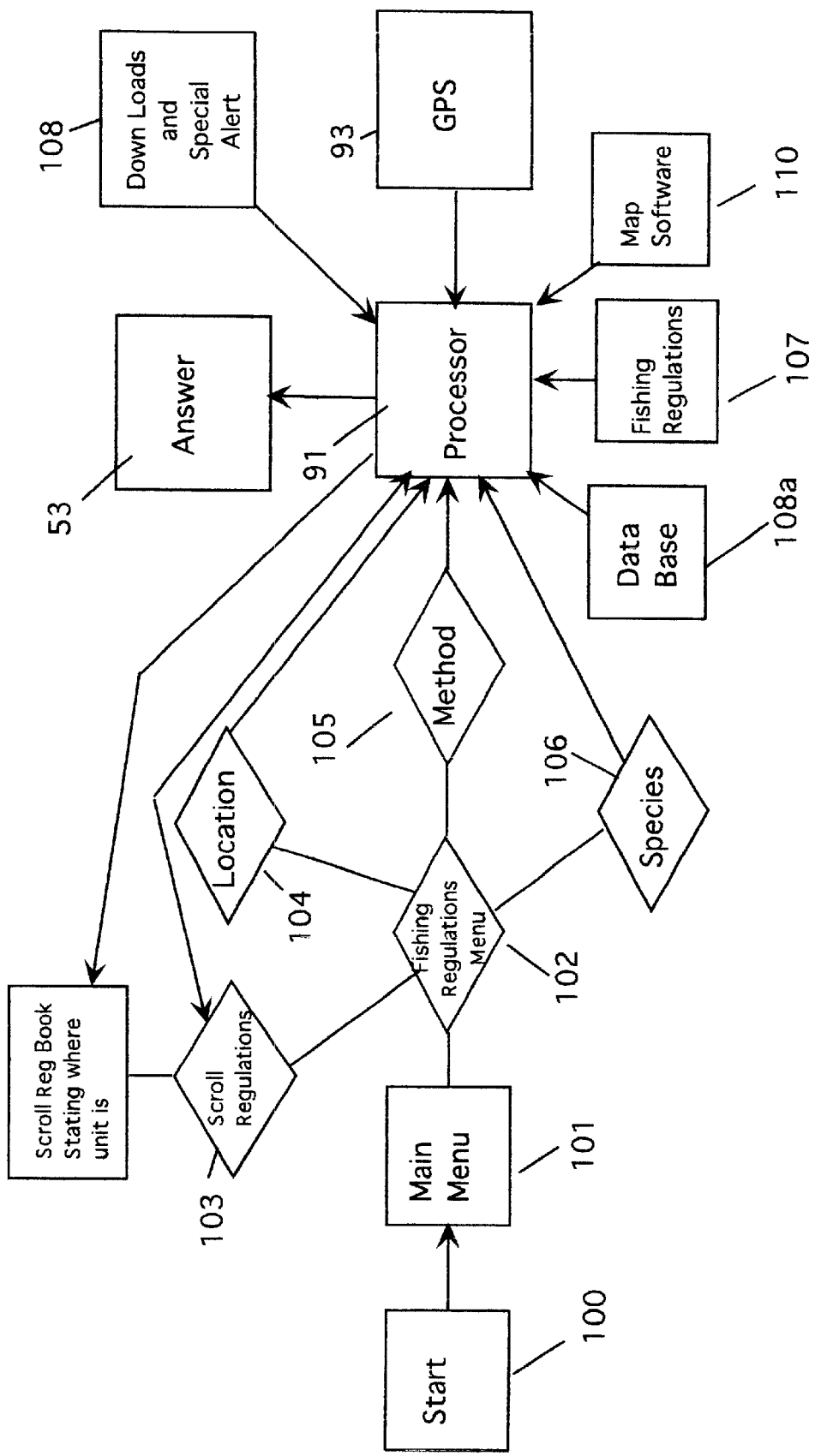
FIG. 6 is a flow chart showing the fishing regulations menu.

FIG. 6 is a flowchart diagram of fishing regulations menu system. The operational steps are as follows. The user begins at start 100. Start calls up the main menu 101 on the display. Using the scroll keys and enter buttons, the user selects the fishing regulations menu 102 from the main menu 101. From there, the user has four choices: a "scroll regulations" selection 103, a location selection 104, a method selection 105 and a species selection 106. If the user wants information about the regulations for a particular species in a given area, the user selects the species line and then selects the particular species from the menu. The processor 91 downloads the location information from the GPS system 93; it then uses that information to determine the regulations unit the user is in, including referring to the map software module 110. The processor then cross-references with the regulations database 107 and the special downloads and alerts database 108. The unit then displays all pertinent information about that species at that location on that day.

If the user selects method, the method menu gives choices as to the type of equipment that can be used, such as pole, lure and bait types. If the user wants information about the regulations for a particular fishing method in a given area, the user selects the method line and then selects the particular method from the menu. The processor 91 downloads the location information from the GPS system 93; it then uses that information to determine the regulations unit for that location. The processor then cross-references with the regulations database 107 and the special downloads and alerts database 108. The unit then displays all pertinent information about that fishing method at that location on that day.

If the user chooses the location selection, the user selects the location line from the menu. The processor 91 downloads the location information from the GPS system 93; it then uses that information to determine the regulations unit for that location. The processor then cross-references with the regulations database 107 and the special downloads and alerts database 108. The unit then displays all pertinent information about fishing at that location on that day.

Finally, if the user selects "scroll regulations" from the menu, the processor brings up all fishing regulations and special alerts pertaining to fishing and allows the user to browse them.

Figure 7:
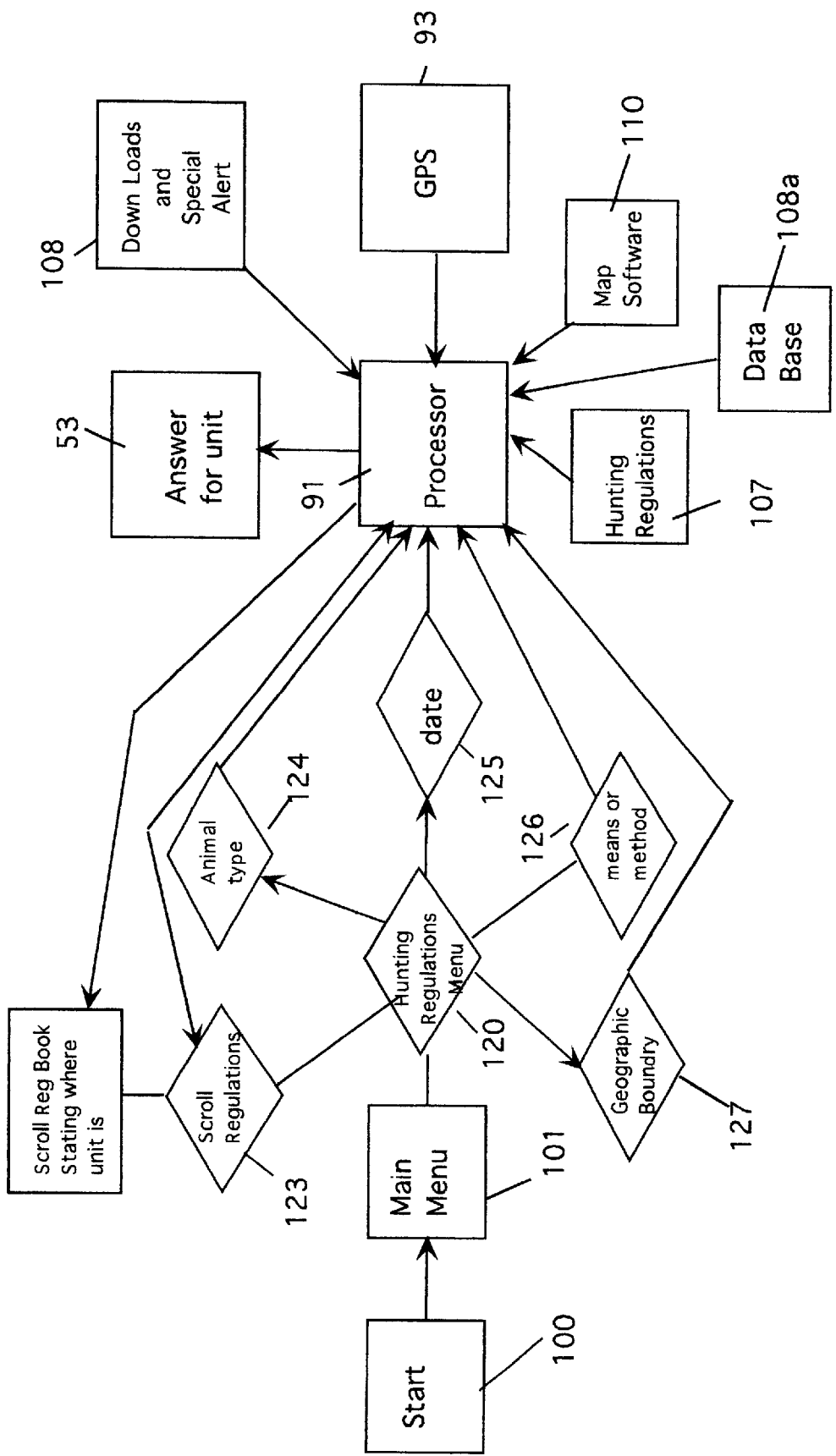
FIG. 7 is a flow chart showing the hunting regulations menu.

FIG. 7 is a flowchart diagram of hunting regulations menu system. The operational steps are as follows. The user begins at start 100. Start calls up the main menu 101 on the display. Using the scroll keys and enter buttons, the user selects the hunting regulations menu 120 from the main menu 101. From there, the user has four choices: a "scroll regulations" selection 123, an animal type selection 124, a date selection 125, a means or method selection 126 and a geographic boundary selection 127.

If the user wants information about the regulations for a particular animal type in a given area, the user selects the animal type line and then selects the particular animal type from that menu. The processor 91 downloads the location information from the GPS system 93; it then uses that information to determine the regulations unit the user is in, including referring to the map software module 110. The processor then cross-references with the regulations database 107 and the special downloads and alerts database 108. The unit then displays, on display 53, all pertinent information about that animal type at that location on that day.

If the user selects the date line, the processor obtains information for the GPS system, map software, and hunting regulations database. The device that displays information on hunting in the particular geographic area for that date and time.

If the user selects means or method, the menu gives choices as to the type of type of weapon that can be used, such as bow, rifle, shotgun or pistol. The user then selects the type of weapon from the menu. Next, the processor 91 downloads the location information from the GPS system 93 and mapping software. It then uses that information to determine the regulations unit for that location. The processor then cross-references with the regulations database 107 and the special downloads and alerts database 108. The unit then displays all pertinent information about using the particular weapon in that location on that day.

If the user selects the geographic location selection from the menu, the processor 91 downloads the location information from the mapping software and GPS system 93; it then uses that information to determine the regulations unit for that location. The processor then cross-references with the regulations database 107 and the special downloads and alerts database 108. The unit then displays all pertinent information hunting regulations for that location on that day.

Finally, if the user selects "scroll regulations" from the menu, the processor brings up all hunting regulations and special alerts pertaining to hunting and allows the user to browse them.

Figure 8:
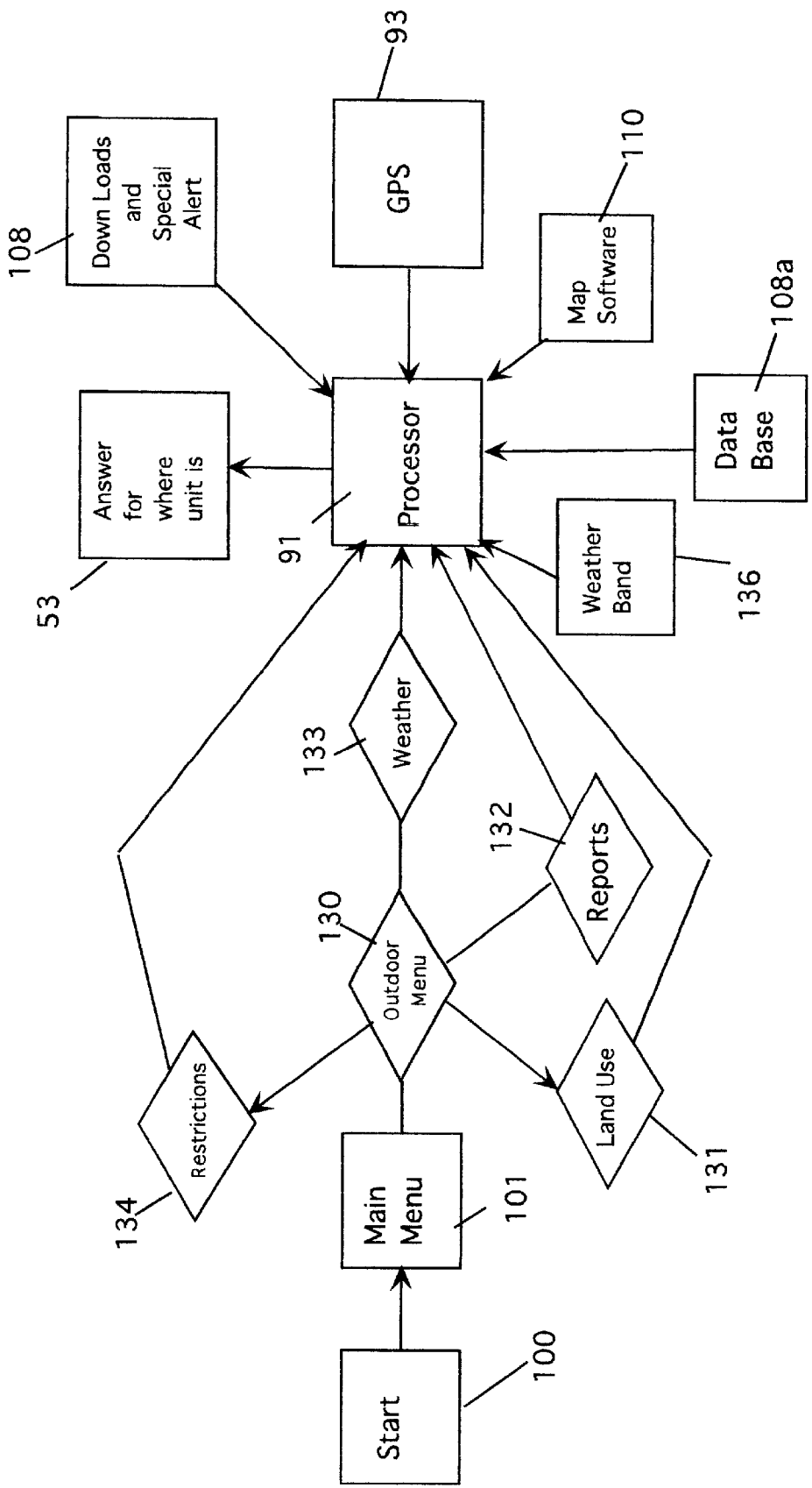
FIG. 8 is a flow chart showing the outdoor menu.

In some menus (e.g., in FIG. 2.) there is an "outdoor" selection on the main menu. FIG. 8 is a flowchart of selections and options typically available on that menu. As before, the user begins at start 100 and chooses the main menu 101 from the selections. From the main menu, the uses selects "outdoor" and presses the enter key. The outdoor menu 130 is then displayed. The outdoor menu has four options: land use 131, reports 132, weather 133 and restrictions 134. If the user selects land use 131, the processor gets information from the GPS and mapping software as to the location of the unit. The processor then cross-references the database and special alerts and downloads. The unit then displays the land use policies and restrictions for that location.

IF the user selects reports 132, the processor gets information from the GPS and mapping software as to the location of the unit. The processor then cross-references the database and special alerts and downloads. The unit then displays any reports for that location. Reports can include snow reports, avalanche reports, surf conditions, tides etc.

If the user selects restrictions 134, the processor gets information from the GPS and mapping software as to the location of the unit. The processor then cross-references the database and special alerts and downloads. The unit then displays known restrictions for that location. Restrictions can include vehicle restrictions, campfire restrictions, etc.

If the user selects weather 133 from the menu, the processor gets information from the GPS and mapping software as to the location of the unit. The unit also can have the ability to tune into the weather band 136 to receive up to date forecasts. The processor then cross-references the special alerts and downloads database 108. The unit then displays weather warnings and weather reports for that location on the display 53.

Figure 9:
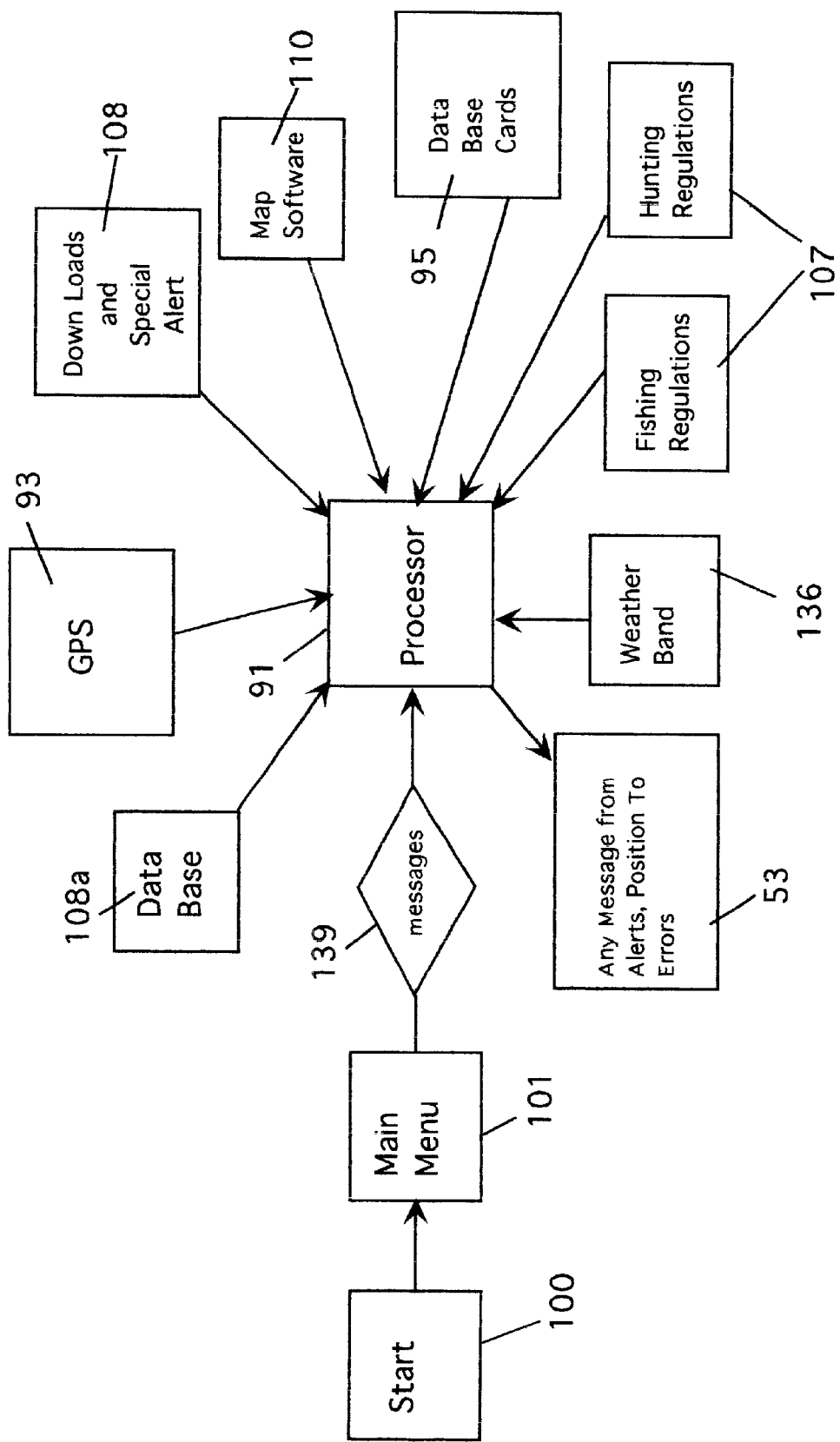
FIG. 9 is a flow chart showing the message menu.

FIG. 9 is a flow chart representation of the messages menu. As before, the user begins at start 100 and selects the main menu 101. From the main menu, the user selects messages 139. The messages menu includes information from the database 108a, database cards 108b, the GPS system 93, weather band 136, hunting and fishing regulations 107, the downloads and alerts 108 and map software module 110. This information, ranging from simple informational messages to alerts is then displayed on the display 53 in response to an alert or alarm status. For example, if a hunter crosses from one hunting unit to another, an alarm can sound (if the user has programmed it so). Checking the messages menu shows the hunter that the hunter has passed from one unit to another and that the regulations must be checked to determine legal hunting status in the new unit.

Figure 10:
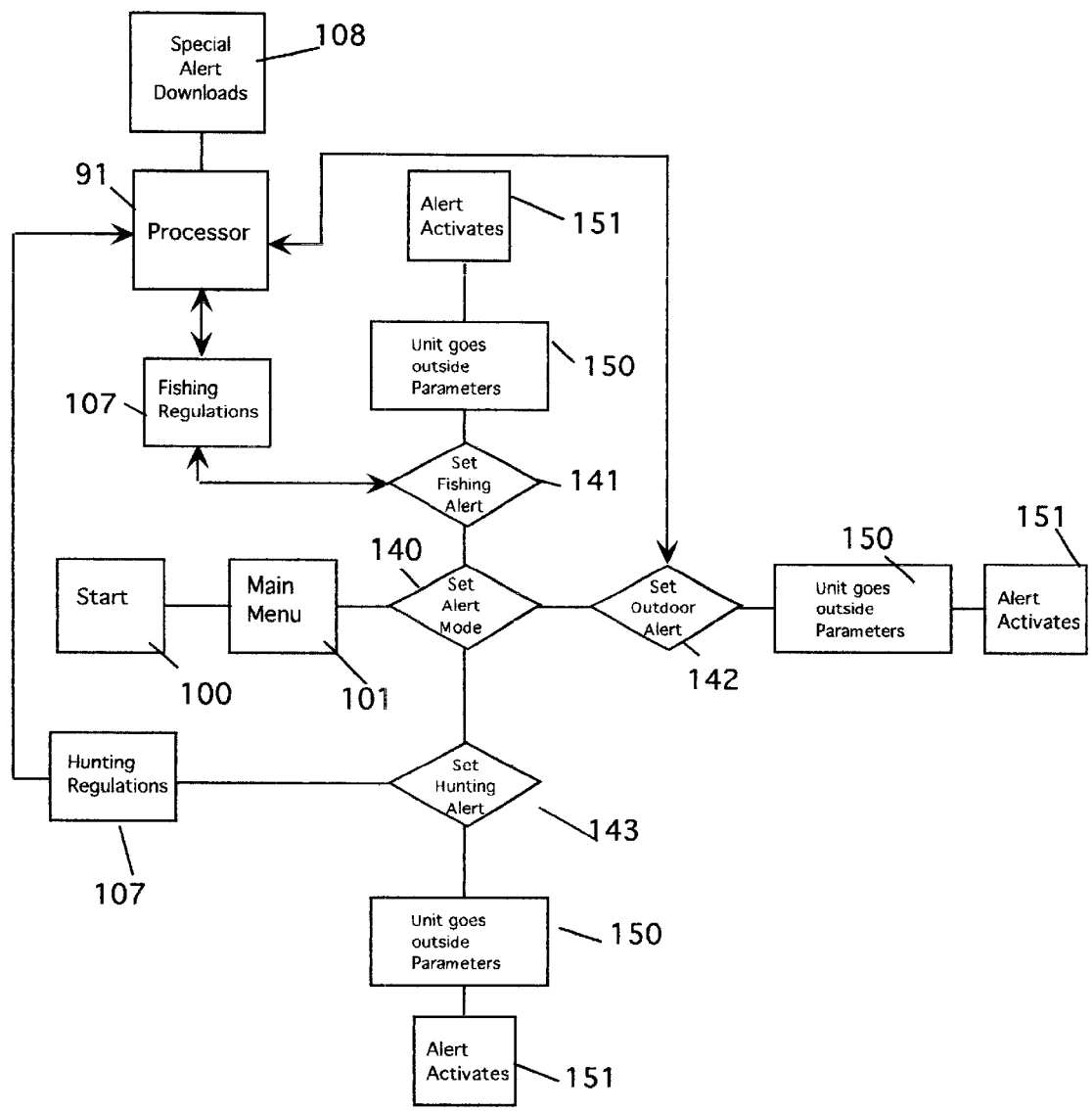
FIG. 10 is a flow chart showing the alert mode menu.

FIG. 10 is a flowchart description of the alert menu. As before, the user begins at start 100, then selects main menu 101. From the main menu, the user selects "set alert mode" 140. The "set alert mode" menu gives the user three choices: set fishing alert 141, set outdoor alert 142, and set hunting alert 143. If the user selects any of the three alert modes, the screens display appropriate parameters that define the alert requirements. If the unit goes outside of the selected parameters, shown in the figure as 150, the unit activates the alert system 151 and advises the user of the alert condition by either an audio alarm, a vibration, or a flashing screen. The FIGS. 2 and 4 show examples of some of these parameters for the fishing and hunting parameters. For the outdoor alerts, the restrictions are such things as camping, campfire restrictions, and weather alerts.

All the alert modes use information obtained from the GPS system 93, the special alert and downloads and alerts database 108, weather band 136, and hunting and fishing regulations 107 to configure the alert based on the parameters selected. These are then ties to the processor 91, which monitors the selected parameters for an out of parameter reading. For example, hunting and fishing seasons are typically date and time sensitive. By setting the alert to date and time, the unit can alert a user when the time for fishing is over for that date.

Figure 11:
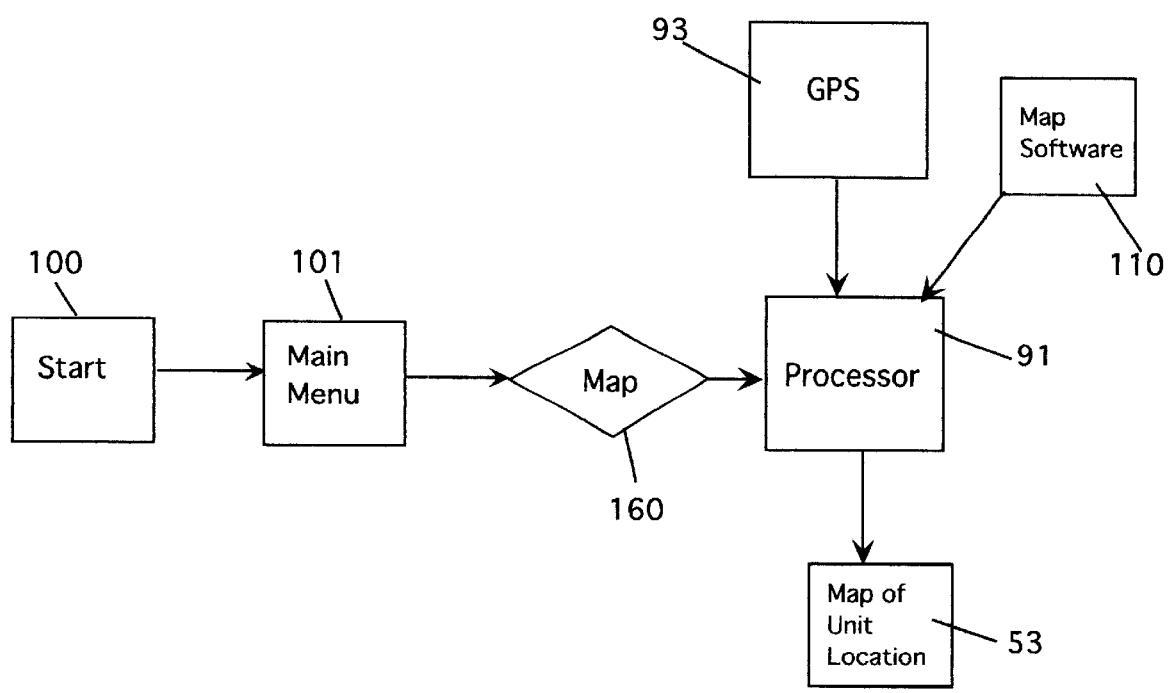
FIG. 11 is a flow chart showing the map menu.

FIG. 11 is a flowchart diagram of the map menu. Here, as before, the user selects start 100, and then the main menu 101. From the main menu then selects the map selection 160. This then engages the processor 91 to acquire a position using the GPS system 93 and the map software module 110 to display a details map of the user's location on the display 53.

Figure 12:
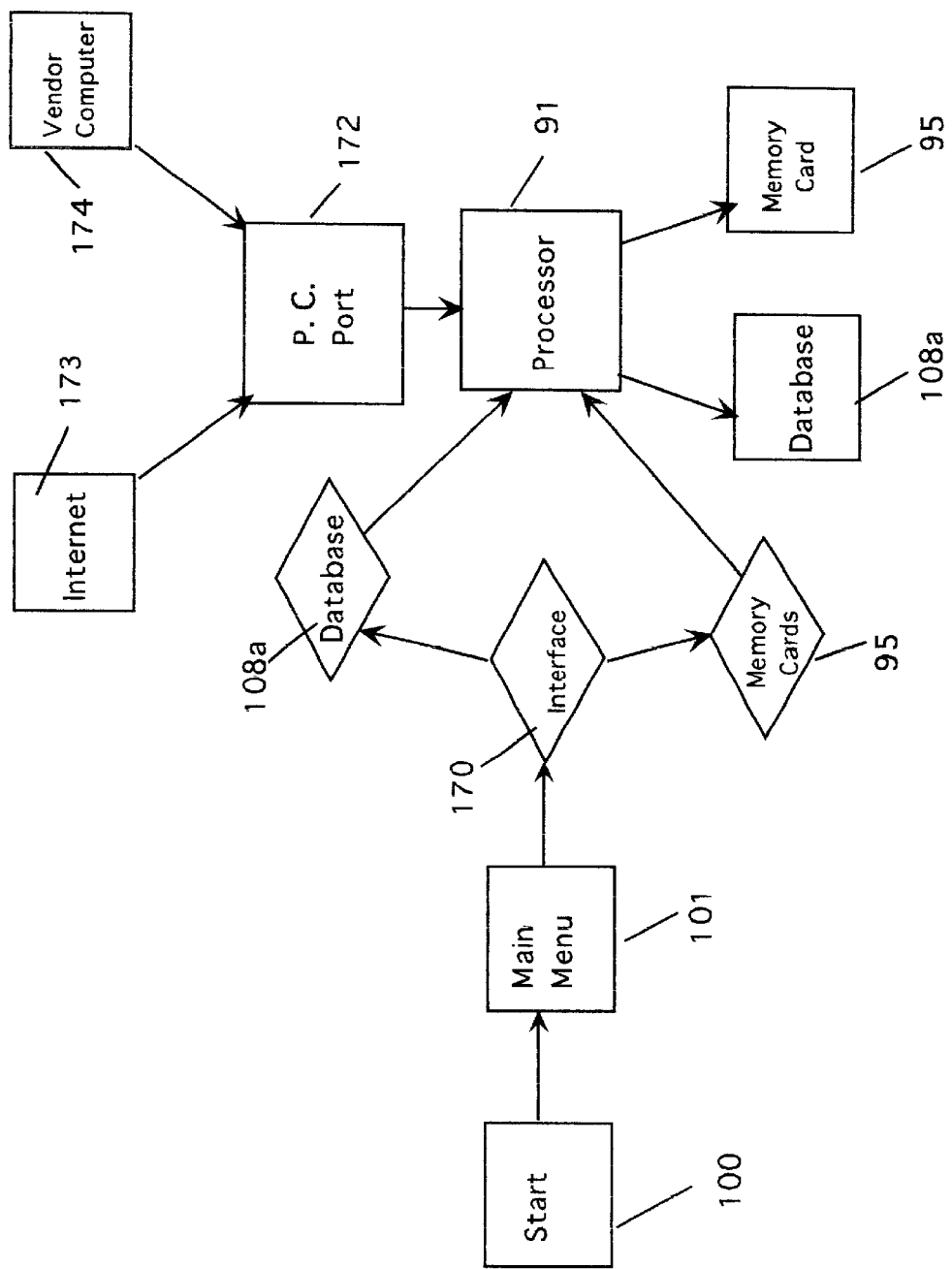
FIG. 12 is a flow chart showing the interface menu diagram.

FIG. 12 is a flowchart diagram of the interface menu. The interface selection allows the user to download new information into the unit. New information can include emergency orders, warnings updated regulations, and new mapping databases. The downloads can be made to the internal database memory or to memory cards.

As before, the user selects start 100, and then the main menu 101. From the main menu, the user chooses the interface selection 170. The user then has a choice between internal database storage 108a and a memory card 95. Downloads are typically obtained through a P.C. port 172 to a base computer that has access to the Internet 173, or vendor computers 174. The information can then be stored on the desired medium either the database 108a or the memory card 95 for later use.

The device can be used in many different ways. In the case of the first embodiment, the simpler system does not allow many of the higher level functions of the preferred embodiment; however, it is still useful as a basic guide. A user can be in the field, hunting or fishing. The user can at any time, check position and determine the regulations for that area. If the user crosses a boundary, the alarm can signal this and the user can then check to see what regulations apply in the new area. Similarly, the user can check, weather, camping guidelines, and other databases while in the field.

The device also lets the user update the information in the system by either direct downloads from the Internet or by using memory cards. Thus, the regulations and boundaries can be updated annually, or during the season-if emergency regulations are issued. In this way, the user can be assured that he or she is in compliance with the particular regulations at all times while in the field.

Moreover, the unit's basic GPS capabilities also ensure that the user always knows his or her correct position and prevents the user from becoming lost in the field.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A hand-held computer for identifying hunting and fishing areas and displaying controlling regulations pertaining thereto comprising:
   a) a housing;
   b) a display screen, installed in said housing;
   c) a plurality of operating keys; attached to said housing;
   d) a central processing unit, in operative connection with said display screen and said plurality of operating keys, installed within said housing;

e) a memory unit, in operative communication with said central processing unit;

f) a database, stored in said memory unit, whereby said database includes a set of regulations for hunting and fishing for a designated area;

g) a global positioning satellite receiver, installed in said housing and in operative communication with said central processing unit, whereby said global positioning satellite receiver provides a geographic position to said central processing unit and further whereby said central processing unit uses the geographic position to extract a set of regulations for hunting and fishing for that geographic position and causes said set of regulations to be displayed on said display screen; and h) an alarm system, in operable communication with said central processing unit whereby when said central processing unit detects a change in a position of a user from a first regulated unit to a second regulated unit, said central processing unit causes said alarm system to alert said user to said change in position.

2. The hand held computer of claim 1 wherein the database further contains information selected from the group of: camping restrictions, campfire restrictions, bait restrictions, weapon/lure restrictions, shooting restricitions, park boundaries, preserve boundaries, refuges, public access areas, hazardous areas warnings, and vehicle restrictions.

3. The hand held computer of claim 1 further comprising a means for updating information stored in said database.

4. The hand-held computer of claim 3 wherein the means for updating information stored in said database comprise a memory card, wherein said memory card has updated information stored thereon.

5. The hand-held computer of claim 3 wherein the means for updating information stored in said database comprises:

a) an internet website, wherein said internet website has updated information that is downloadable to a host computer; and b) an interface, in operable communication with said host computer and said hand-held computer to allow information transfers from said host computer to said hand-held computer.

6. A hand-held computer for identifying hunting and fishing areas and displaying controlling regulations pertaining thereto comprising:

a) a housing;

b) a display screen, installed in said housing;

c) a plurality of operating keys; attached to said housing;

d) a central processing unit, in operative connection with said display screen and said plurality of operating keys, installed within said housing;

e) a memory unit, in operative communication with said central processing unit;

f) a database, stored in said memory unit, whereby said database includes a set of regulations for hunting and fishing for a designated area;

g) a global positioning satellite receiver, installed in said housing and in operative communication with said central processing unit, whereby said global positioning satellite receiver provides a geographic position to said central processing unit and further whereby said central processing unit uses the geographic position to extract a set of regulations for hunting and fishing for that geographic position and causes said set of regulations to be displayed on said display screen; and h) a programmable alarm system having a plurality of alarm settings, wherein said programmable alarm system is programmed to provide a warning signal in response to variations in a user's position that moves a user from a first regulation unit to a second regulation unit.

7. The hand-held computer of claim 6 wherein the plurality of alarm settings is selected from the group of: changes in a hunting boundary, changes in a fishing boundary, changes in hunting hours, changes in fishing hours, camping restrictions, campfire restrictions, bait restrictions, weapon restrictions, lure restrictions, shooting restrictions, park boundaries, preserve boundaries, refuges, public access areas or lack of, bag limit changes, hazardous areas, vehicle restrictions, private property, federal land, or state land locations.

8. A method of obtaining information regarding hunting or fishing regulations in a given area utilizing a hand-held computer that has a housing; an alarm system; a display screen, installed in said housing; plurality of operating keys; attached to said housing; a central processing unit, in operative connection with said display screen and said plurality of operating keys, installed within said housing; a memory unit, in operative communication with said central processing unit; a database, stored in said memory unit, whereby said database includes a set of regulations for hunting and fishing for a designated area; and a global positioning satellite receiver, installed in said housing and in operative communication with said central processing unit, whereby said global positioning satellite receiver provides a geographic position to said central processing unit and further whereby said central processing unit uses the geographic position to extract a set of regulations for hunting and fishing for that geographic position and causes said set of regulations to be displayed on said display screen, comprising the steps of:

a) storing a set of hunting regulations in said database;

b) storing a set of fishing regulations in said database;

c) storing location information applicable to said sets of hunting and fishing regulations in said database;

d) transporting said hand-held computer to a given field location;

e) using said global positioning satellite receiver installed in said hand-held computer to determine an exact position of said hand-held computer;

f) using said location information stored in said database to determine applicable regulations for hunting and fishing for the exact position identified by the global positioning satellite receiver;

g) setting the alarm system to indicate an alert condition, whereby said alert condition being activated when said hand-held computer is moved from a first regulated area to a second regulated area; and h) having said alarm system signal a user when said hand-held computer moves from said first regulated area to a second regulated area.

9. The method of obtaining information regarding hunting or fishing regulations in a given area utilizing a hand-held computer of claim 8 further comprising the steps of:

a) programming said programmable alarm system with a plurality of warning indicators regarding a plurality of activities and restrictions, whereby said plurality of warning indicators regarding a plurality of activities and restrictions are based on specific geographical locations; and b) displaying one of said plurality of warning indicators when a user selects information about the one of said plurality of warning indicators for a given geographic location, from a selection menu displayed on said display screen.

10. The method of obtaining information regarding hunting or fishing regulations in a given area utilizing a handheld computer of claim 9 wherein the plurality of activities and restrictions is restrictions is selected from the group of: changes in hunting hours, changes in fishing hours, camping restrictions, campfire restrictions, bait restrictions, weapon restrictions, lure restrictions, shooting restrictions, park boundaries, preserve boundaries, refuges, public access areas or lack of, bag limit changes, hazardous areas, vehicle restrictions, private property, federal land, or state land locations.

* * * * *